(12) United States Patent
Chang et al.

(10) Patent No.: US 10,070,048 B2
(45) Date of Patent: Sep. 4, 2018

(54) PANORAMA PHOTOGRAPHING METHOD, PANORAMA DISPLAYING METHOD, AND IMAGE CAPTURING METHOD

(71) Applicant: HTC Corporation, Taoyuan County (TW)

(72) Inventors: Ruey-Jer Chang, Taoyuan County (TW); Scott Chien-Hung Liao, Taoyuan County (TW); Chih-Wei Cheng, Taoyuan County (TW); Horng-Lin Chen, Taoyuan County (TW); Tsai-Hsin Liu, Taoyuan County (TW); Tung-Peng Wu, Taoyuan County (TW)

(73) Assignee: HTC CORPORATION, Taoyuan County (TW)

( * ) Notice: Subject to any disclaimer, the term of this patent is extended or adjusted under 35 U.S.C. 154(b) by 645 days.

(21) Appl. No.: 14/282,218

(22) Filed: May 20, 2014

(65) Prior Publication Data

US 2014/0333718 A1 Nov. 13, 2014

Related U.S. Application Data

(63) Continuation of application No. 14/219,690, filed on Mar. 19, 2014, now abandoned.
(Continued)

(30) Foreign Application Priority Data

Mar. 26, 2014 (CN) .......................... 2014 1 0116671
Mar. 26, 2014 (TW) .............................. 103111176 A (51) Int. Cl.
*H04N 5/232* (2006.01)

(52) U.S. Cl.
CPC ..... *H04N 5/23222* (2013.01); *H04N 5/23238* (2013.01); *H04N 5/23293* (2013.01)

(58) Field of Classification Search
CPC ........... H04N 5/23222; H04N 5/23238; H04N 5/23293
See application file for complete search history.

(56) References Cited

U.S. PATENT DOCUMENTS

| 6,144,501 A | 11/2000 | Nalwa |
| 2006/0092306 A1* | 5/2006 | Kim ................... H04N 5/23293 348/333.01 |

(Continued)

FOREIGN PATENT DOCUMENTS

| CN | 101093348 A | 12/2007 |
| CN | 101288025 A | 10/2008 |

(Continued)

OTHER PUBLICATIONS

Taiwanese Office Action dated Jan. 21, 2015.
(Continued)

*Primary Examiner* — Peter D Le
(74) *Attorney, Agent, or Firm* — Rabin & Berdo, P.C.

(57) ABSTRACT

A panorama photographing method, a panorama displaying method and an image capturing method are used in an electronic device. The photographing method includes the following steps. Firstly, a plurality of predefined target positions required to produce a panoramic image are determined. Then, a navigator comprising a plurality of indications representing the plurality of predefined target positions is shown. A plurality of target photographs corresponding to the plurality of predefined target positions are captured and appearance of the plurality of indications according to a capturing status of the plurality of target photographs is
(Continued)

changed. Afterwards, the panoramic image is generated according to the plurality of target photographs.

20 Claims, 11 Drawing Sheets

Related U.S. Application Data (60) Provisional application No. 61/805,155, filed on Mar. 26, 2013.

(56) References Cited

U.S. PATENT DOCUMENTS

| | | | |
|---|---|---|---|
| 2006/0181619 A1* | 8/2006 | Liow | G03B 17/02 348/239 |
| 2007/0253698 A1 | 11/2007 | Park et al. | |
| 2008/0066000 A1* | 3/2008 | Ofek | G06F 17/30241 715/757 |
| 2010/0066810 A1* | 3/2010 | Ryu | H04N 5/232 348/36 |
| 2011/0105192 A1 | 5/2011 | Jung et al. | |
| 2012/0120188 A1* | 5/2012 | Arai | H04N 5/23238 348/36 |
| 2012/0194637 A1 | 8/2012 | Han et al. | |
| 2013/0104025 A1 | 4/2013 | Bennett et al. | |
| 2014/0210953 A1* | 7/2014 | Ego | G03B 15/00 348/49 |
| 2014/0267592 A1* | 9/2014 | Lee | H04N 5/23238 348/36 |

FOREIGN PATENT DOCUMENTS

| | | |
|---|---|---|
| EP | 2779620 A1 | 9/2014 |
| KR | 10-2008-0094321 A | 10/2008 |
| TW | I274971 B | 3/2007 |
| TW | I347125 B | 8/2011 |
| WO | WO 2007-035310 A1 | 3/2007 |
| WO | WO 2012-086326 A1 | 6/2012 |
| WO | WO 2012-131151 A1 | 10/2012 |
| WO | WO-2012154365 A2 | 11/2012 |
| WO | WO-2014033354 A1 | 3/2014 |

OTHER PUBLICATIONS

German Office Action dated Jan. 27, 2015.
Chinese Office Action dated Nov. 30, 2016.
Chinese Office Action dated Jun. 9, 2017.
German Office Action dated Aug. 18, 2017.

* cited by examiner

PANORAMA PHOTOGRAPHING METHOD, PANORAMA DISPLAYING METHOD, AND IMAGE CAPTURING METHOD

This application is a continuation application of U.S. Ser. No. 14/219,690, filed on Mar. 19, 2014 and claims the benefits of U.S. provisional application Ser. No. 61/805,155, filed Mar. 26, 2013, Taiwanese application No. 103111176, filed Mar. 26, 2014, and Chinese application No. 201410116671.4, filed Mar. 26, 2014, the disclosures of which are incorporated by reference herein in its entirety.

TECHNICAL FIELD

The disclosed embodiments relates in general to a photographing method, a displaying method, and an image capturing method, and more particularly to a panorama photographing method, a panorama displaying method, and an image capturing method from a panoramic image.

BACKGROUND

To cater for the photographing demands of consumers, electronic devices such as mobile phones, digital cameras or tablet computers are usually equipped with lenses and display screens for allowing the users to capture photographs. In addition, some electronic devices with the photographing functions (hereinafter referred as photographing devices) further provide the functions of panorama photographing.

Panoramic photography is a style of photography that aims to create images with exceptionally wide fields of view. Normally, a panoramic image is made by successively capturing multiple photographs and then stitching these photographs together as a larger-sized panoramic image.

Figure 1:
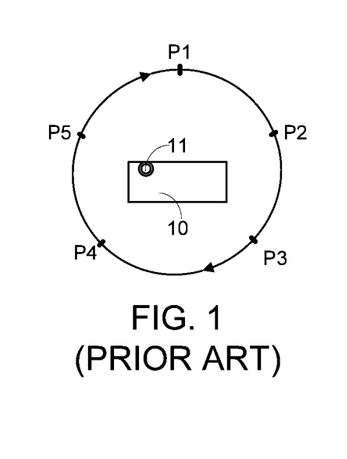
FIG. 1 (prior art) shows a schematic top view that photographs corresponding to target positions on the same horizontal plane are captured by the photographing device.

Referring to FIG. 1, photographs corresponding to target positions on the same horizontal plane are captured by the photographing device 10. The photographing device 10 has a lens 11 for making images of scenes and a display screen (not shown) for displaying corresponding preview images.

In FIG. 1, the photographing device 10 is rotated along a clockwise direction. Moreover, the photographing device 10 captures photographs corresponding to a first position P1, a second position P2, a third position P3, a fourth position P4, and a fifth position P5 in succession. The five adjacent photographs in which the scenes are partially overlapped are stitched together for generating a panoramic image.

Quality of the panoramic image dramatically depends on the relevance among captured photographs, the number of photographs and so forth. When more photographs are captured, quality of the stitched panoramic image becomes better. However, to capture more photographs brings inconveniences and also increases complexities of stitching.

SUMMARY

The disclosure is directed to a panorama photographing method, a panorama displaying method, and an image capturing method.

According to one embodiment, a panorama photographing method for use in an electronic device is provided. The photographing method includes following steps. Firstly, the electronic device determines a plurality of predefined target positions required to produce a panoramic image. Then, a navigator is shown, wherein the navigator includes a plurality of indications representing the plurality of predefined target positions. The electronic device captures a plurality of target photographs corresponding to the plurality of predefined target positions. An appearance of the plurality of indications is changed according to capturing status of the plurality of target photographs. The electronic device generates the panoramic image according to the plurality of target photographs.

According to another embodiment, a panorama photographing method for use in an electronic device is provided. The photographing method includes following steps. A preview screen is displayed in a first display mode. The electronic device calculates a plurality of predefined target positions required to produce a panoramic image, wherein the plurality of predefined target positions are located in a three-dimensional space. In response to rotation of the electronic device, one of the predefined target positions in the preview screen is displayed. When the electronic device is aligned with the one predefined target position, a region showing the target photograph in the preview image is changed to display from a first display mode to a second display mode.

According to yet another embodiment, a panorama displaying method is provided. The panorama displaying method includes following steps. An electronic device provides a panoramic image and a default position. An operation signal is sensed and a target position is correspondingly determined. The panoramic image is perspectively projected for displaying a virtual image according to the target position. An angle viewing indicator is shown in order to indicate a viewing angle between the default position and the target position.

According to an alternative embodiment, an image capturing method is provided. The image capturing method includes following steps. An electronic device provides a panoramic image and senses an operation signal. Then, a target position is correspondingly determined. The panoramic image is perspectively projected for displaying a virtual image according to the target position. The displayed virtual image is captured as a selected image.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

For the sake of illustration, the raw photographs used for stitching a panoramic image are further classified into an initial photograph and target photographs. Basically, the initial photograph is the firstly captured raw photograph, and the target photographs are the rest raw photographs required to generate the panoramic image.

In this context, the term "predefined target position" denotes the position of the photographing device that is predefined by the panorama algorithm for capturing the target photographs. In short, the initial position corresponding to the initial photograph is manually determined by the user, but the predefined target positions corresponding to the target photographs are estimated by the panorama algorithm.

The present embodiment provides a method guiding the user to quickly capture target photographs. Several prompt patterns are adopted in the embodiment to accelerate the panorama photographing and panorama displaying. Shown on the graphic user interface (hereinafter, GUI), these prompt patterns assist the user to operate the photographing device.

For instance, a type of prompt patterns (i.e. target patterns) indicates the predefined target positions on the display screen. Thus, the target photographs can be properly and efficiently captured as soon as the photographing device is aligned with any of the predefined target positions. In addition to the target patterns, the photographing device also provides some other types of prompt patterns. In the following embodiments, the appearance and position of the prompt patterns are presented herein for purpose of illustration and description only.

Figure 2:
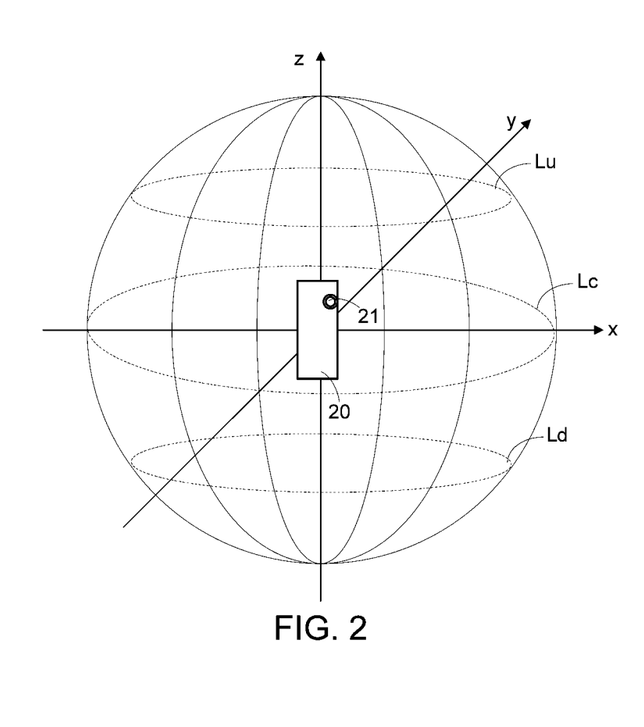
FIG. 2 shows a schematic view illustrating the photographing device for capturing photographs in a three-dimensional space.

Referring to FIG. 2, the photographing targets required for generating the panorama image are distributed in a three-dimensional space. In FIG. 2, the x-axis, y-axis and z-axis indicate three directions in the three-dimensional space. A photographing device 20 is located at center position (x, y, z)=(0, 0, 0) of the three-dimensional spherical space. Generally, location of the photographing device 20 is fixed at the center of the spherical space, but the photographing device 20 may be rotated along any of the x-axis, y-axis, and z-axis.

The horizontal plane is defined as the x-y plane, and it is assumed that the original posture of the photographing device 20 is perpendicular to the horizontal plane. As shown in FIG. 2, the plural dotted lines in parallel with the x-y plane are called "parallels", and the plural solid lines perpendicular to the x-y plane are called "meridians".

Firstly, it is assumed that the photographing device 20 stays to be perpendicular to the horizontal plane. Then, while being rotated around the z-axis, the photographing device 20 starts to capture target photographs corresponding to the photographing targets located at the center parallel Lc.

By adjusting the posture of the photographing device 20, a tilt angle between the photographing device and the x-y plane is accordingly changed. Consequently, the photographing device 20 captures target photographs corresponding to photographing targets located at the upper parallel Lu and the lower parallel Ld.

In short, in order to capture target photographs, photographing targets may be selected from various parallels of the spherical surface. Since the center parallel Lc is the longest parallel, number of photographing targets being selected at the center parallel Lc is greater than that at the upper parallel Lu or the lower parallel Ld.

After the initial photograph and all target photographs are stitched together by the panoramic image algorithm, a spherical panorama image is produced. While viewing the spherical panorama image, the user may feel like staying at the center position of the sphere in FIG. 2 to observe the panoramic image attached on the spherical surface.

Figure 3:
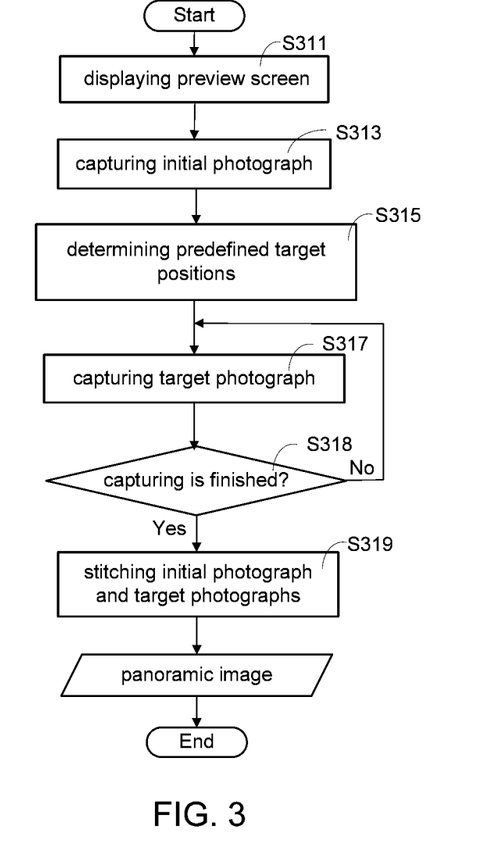
FIG. 3 shows a flow chart of generating the panoramic image according to one embodiment.

Referring to FIG. 3, a flow chart of generating the panoramic image is illustrated. When a lens of the photographing device 20 is aimed at a scene, a preview screen corresponding to the scene is shown on a display screen (step S311). In case that the photographing device 20 is moved or rotated by the user, contents shown on the preview screen are changed. After the user confirms to capture, the initial photograph is captured (step S313).

After the initial photograph is captured, the target positions of the photographing device 20 corresponding to the target photographs are determined estimated or calculated by the panoramic image algorithm (step S315). Here, these estimated target positions are named as predefined target position (CP). In step S315, the panoramic algorithm calculates and estimates number and positions of the predefined target positions according to parameters, such as complexities, capturing angle, and viewing angle of the initial photograph. Then, the photographing device 20 successively captures target photographs (step S317).

Afterwards, photographing process of the panoramic image is determined to be finished or not (step S318). If step S318 determines that capturing is not finished, the photographing device 20 successively captures the remaining target photographs. If step S318 determines that capturing is finished, the photographing device 20 proceeds to stitch the initial photograph and captured target photographs together to generate the panoramic image (step S319).

In practical application, step S318 may be considered to be satisfied when all the target photographs corresponding to the predefined target position are completely captured. However, determination condition of step S318 is not limited. For instance, when the user intends to interrupt the process of photographing panoramic image after a few of target photographs are captured, step S318 can be considered as satisfied.

Figure 4A:
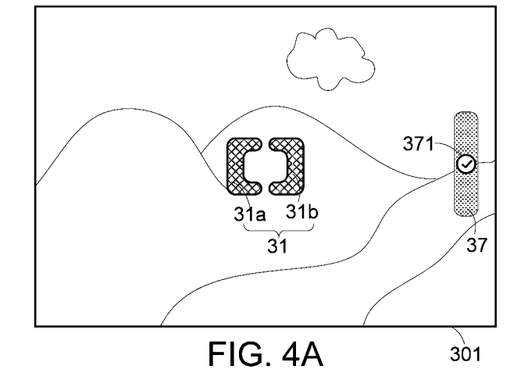
FIG. 4A shows a schematic view illustrating content of the display screen when the initial photograph has been captured.

Referring to FIG. 4A, the initial photograph is shown on the display screen. In addition to the initial photograph, the display screen 301 shows a focusing frame 31 and a confirmation pattern 37. The focusing frame 31 indicates a focal position of the lens and is usually located at center of the display screen 301. In FIG. 4A, the focusing frame 31 includes a left part 31a and a right part 31b. Besides, the confirmation pattern 37 represents whether a capturing condition is satisfied.

The photographing device 20 continues capturing target photographs only if the capturing condition is satisfied. Capturing the target photographs may be done by manual operations or an automatic function. In this embodiment, a prompt symbol 371 is included in the confirmation pattern 37 to indicate whether the capturing process may continue.

Before the initial photograph is taken, the prompt symbol 371 of the confirmation pattern 37 remains as ready to capture (such as a tick mark in FIG. 4A). After the initial photograph is captured, the prompt symbol 371 of the confirmation pattern 37 changes to prohibiting to capture (such as a cross mark in FIG. 4B) and stays as it is until the capturing condition of target photograph is again satisfied. In accordance with the present embodiment, each predefined target position is corresponding to a target pattern 33. After the focusing frame 31 circumscribes one of the target patterns 33 representing the predefined target positions which are not captured, the capturing condition is satisfied. A target photograph may be captured automatically or manually when capturing condition is satisfied.

Figure 4B:
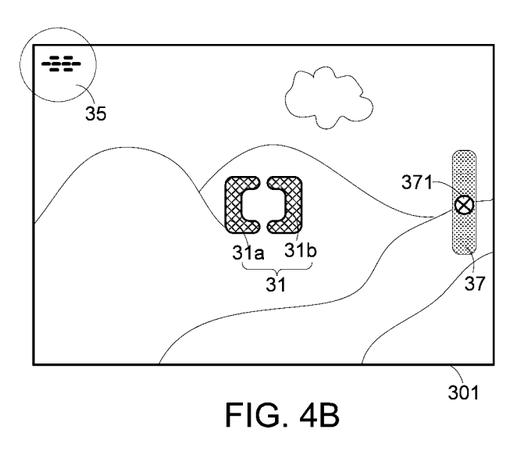
FIG. 4B shows a schematic view illustrating the prompt patterns shown by the display screen when the photographing device is about to capture the photograph.

In this embodiment, the prompt symbol 371 of the confirmation pattern 37 indicates whether satisfaction of the capturing condition is satisfied or not. Alternatively, in some other embodiments, the confirmation pattern 37 may be set to be disappeared when the capturing condition is not satisfied and vice versa.

Referring to FIG. 4B, some prompt patterns are shown on the display screen after the initial photograph is taken. In comparison with FIG. 4A, a navigator 35 indicating a plurality of predefined target positions relative to the initial position is shown on the display screen 301.

When posture of the photographing device 20 changes, scenes shown on the preview screen is correspondingly changed. Accordingly, positions indicating target patterns 33 in the preview screen will correspondingly change. On the other hand, the focusing frame 31 is still located at the center of the display screen 301 even if contents of the preview screen change.

Hence, the focusing frame 31 and the target pattern 33 may have two types of relative positions in accordance whether target photographs can be captured or not.

A possible relative position between the focusing frame 31 and the target pattern 33 is that the focusing frame 31 circumscribes the target pattern 33. That is, the target pattern 33 corresponding to the predefined target position is selected by the focusing frame 31. In such case, the capturing condition is satisfied. Therefore, the target photographs can be captured, and the focusing frame 31 and the target pattern 33 will be shown in an active mode.

Another possible relative position between the focusing frame 31 and the center of the predefined target position is that the latter is not in the range of the former. In other words, the target pattern 33 corresponding to the predefined target position is not selected by the focusing frame 31. In such case, the capturing condition is not satisfied. Therefore, the focusing frame 31 and the target pattern 33 will be shown in a standby mode.

In response to changes between the active mode or the standby mode, transparency parameters, color tone parameters or gray level parameters of the focusing frame 31 and the target pattern 33 may correspondingly vary.

In this embodiment, the navigator 35 for representing distribution of the predefined target positions is located an upper left corner of the display screen 301. Each of the indications contained in the navigator 35 correspondingly represents a predefined target position, and number of the indications is identical to that of the predefined target positions. Details about these indications are further illustrated below.

Figure 5A:
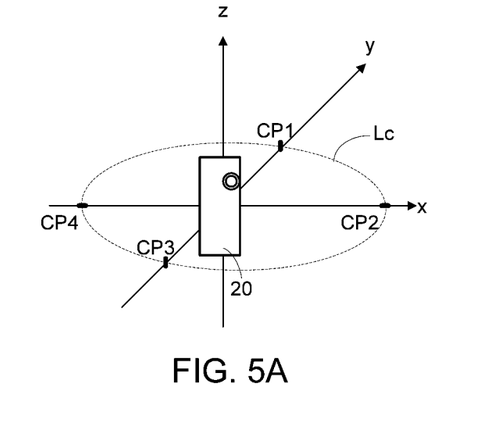
FIG. 5A shows a schematic view illustrating the predefined target positions of the center parallel.

FIG. 5A is a schematic view illustrating the predefined target positions of the center parallel. Along the center parallel Lc, a first predefined target position CP1 is located at the positive y-axis, a second predefined target position CP2 is located at the positive x-axis, a third predefined target position CP3 is located at the negative y-axis, and a fourth predefined target position CP4 is located at the negative x-axis.

Figure 5B:
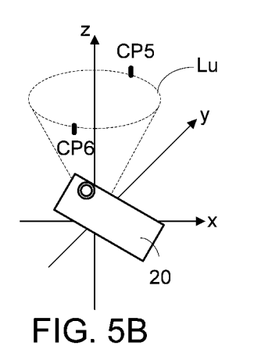
FIG. 5B shows a schematic view illustrating the predefined target positions of the upper parallel.

FIG. 5B is a schematic view illustrating the predefined target positions of the upper parallel. When the photographing device 20 captures the target photographs corresponding to the scenes at the predefined target positions of the upper parallel Lu, an included angle is formed between the photographing device 20 and the horizontal plane (i.e. the x-y plane). As shown in FIG. 5B, a fifth predefined target position CP5 and a sixth predefined target position CP6 are arranged along the upper parallel Lu.

Figure 5C:
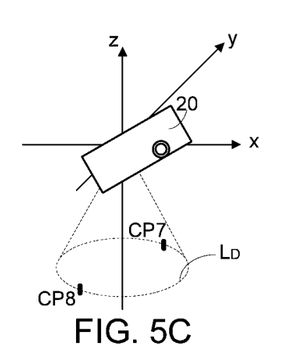
FIG. 5C shows a schematic view illustrating the predefined target positions of the lower parallel.

FIG. 5C is a schematic view illustrating the predefined target positions of the lower parallel. When the photographing device 20 captures the target photographs corresponding to the scenes at the predefined target positions of the lower parallel Ld, an included angle is formed between the photographing device 20 and the horizontal plane (i.e. the x-y plane). As shown in FIG. 5C, a seventh predefined target position CP7 and an eighth predefined target position CP8 are arranged along the lower parallel Ld.

Figure 6:
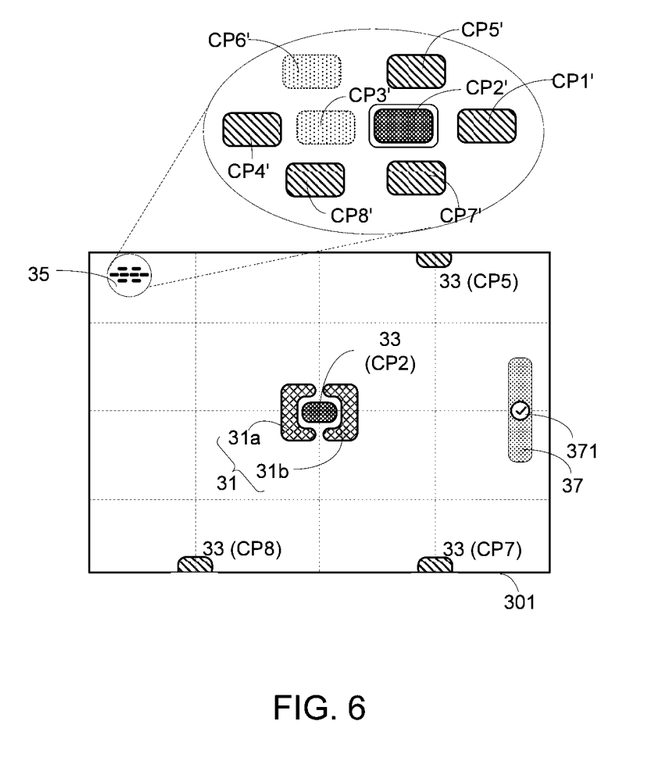
FIG. 6 shows a schematic view illustrating the mapping between indications contained in the navigator and the predefined target positions.

Referring to FIG. 6, indications contained in the navigator are mapped to the predefined target positions. Three rows of indications CP1', CP2', CP3', CP4', CP5', CP6', CP7', CP8' are shown in the navigator 35. Each indication indicates a corresponding predefined target position. Moreover, the relative positions among the indications CP1', CP2', CP3', CP4', CP5', CP6', CP7', CP8' of the navigator 35 are positively correlated with relative positions among the predefined target positions.

The first row of the navigator 35 contains the fifth and sixth indications CP5', CP6' respectively representing the fifth predefined target position CP5 and the sixth predefined target position P6 as shown in FIG. 5B. The second row of the navigator 35 contains the first, the second, the third, and the fourth indications CP1', CP2', CP3', CP4' respectively representing the first predefined target position CP1, the second predefined target position CP2, the third predefined target position CP3, and the fourth predefined target position CP4 as shown in FIG. 5A. The third row of the navigator 35 contains the seventh and the eighth indications CP7', CP8' respectively indicate the seventh predefined target position CP7 and the eighth predefined target position CP8 as shown in FIG. 5C.

As the center of the navigator 35, the indication CP3' corresponds to the predefined target position corresponding to the initial photograph. The rest indications correspond to the predefined target positions. Indications contained in the navigator are shown in three different states to represent whether their corresponding target photographs are captured, to be captured, or not yet captured.

For the not yet captured target photographs, their corresponding indications are shown in a first state. For the captured target photographs, their corresponding indications are shown in a second state. For the to-be captured target photograph, its corresponding indication is shown in a third state.

For example, the third and the sixth indications CP3', CP6' are shown in dot shade, for representing the target photographs corresponding to the third and the sixth predefined target position CP3, CP6 are not yet captured. The first, the fourth, the fifth, the seventh, and the eighth indications CP1', CP4', CP5', CP7' and CP8' are shown in oblique lines, for represent the target photographs corresponding to the first, the fourth, the fifth, the seventh, and the eighth predefined target positions CP1, CP4, CP5, CP7 and CP8 are already captured. And, the indication CP2' is shown in darker shade, for representing the target photograph corresponding to the second predefined target position CP2 is about to be captured.

In accordance with the this context, the states of the indications may be set by brightness parameters, transparency parameters, color tone parameters or gray level parameters.

Moreover, in this embodiment, the display screen 301 may show plural target patterns 33 corresponding to the predefined target positions. In FIG. 6, the target pattern 33 corresponding to the second predefined target position CP2 is circumscribed by the focusing frame 31. Moreover, some adjacent predefined target positions of the second predefined target position CP2 are also shown on the display screen 301. After the scene at the second predefined target position CP2 is captured, the user may refer to these adjacent target patterns 33 and then decides whether or not to continue the capturing process. Moreover, a grid for indicating relative positions may be shown on the display screen 301.

In the above embodiment, a spherical panoramic image will be efficiently produced with the assistance of prompt patterns including the focusing frame 31, the target patterns 33 and the confirmation pattern 37. In accordance with the present embodiment, the photographing device 20 captures the target photographs only when the predefined target positions are accurately focused. Therefore, the quality of the panoramic image is assured.

According to these prompt patterns, sequence of capturing target photographs can be determined according to the user's preference. Furthermore, it is noted that the this context is not restricted to the production of the spherical panoramic image.

Figure 7A:
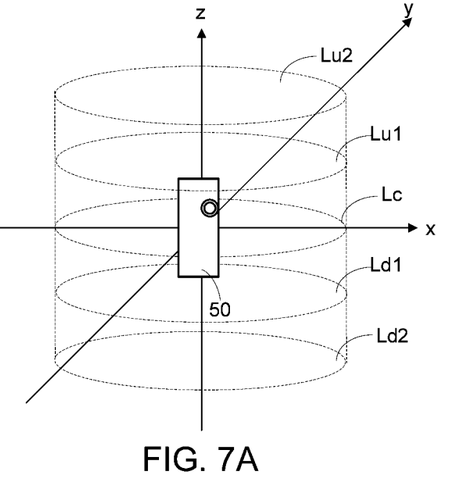
FIG. 7A shows a schematic view illustrating the use of the photographing device to produce a cylindrical panoramic image.

FIG. 7A is a schematic view illustrating the use of the photographing device to produce a cylindrical panoramic image. In a cylindrical space, the photographing device 50 captures photographs corresponding to predefined target positions at five parallels Lu2, Lu1, Lc, Ld1 and Ld2. Since lengths of all parallels of the cylindrical space are identical, the numbers of predefined target positions at all parallels may be identical.

Figure 7B:
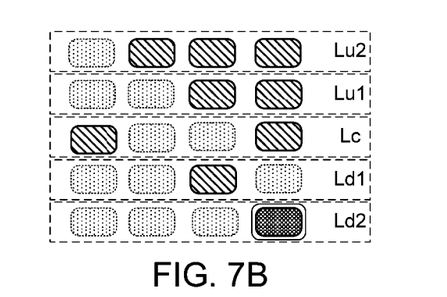
FIG. 7B shows a schematically view illustrating the navigator corresponding to the predefined target positions of FIG. 7A.

FIG. 7B schematically illustrates the navigator corresponding to the predefined target positions of FIG. 7A. In this embodiment, four predefined target positions at each of the five parallels Lu2, Lu1, Lc, Ld1 and Ld2 are selected. From top to bottom, the five rows of indications respectively correspond to the predefined target positions at a second upper parallel Lu2, a first upper parallel Lu1, a center parallel Lc, a first down parallel Ld1 and a second down parallel Ld2 shown in FIG. 7A. Similarly, these indications may be set to different states representing whether their corresponding predefined target positions are not captured, captured, or to be captured.

From the above discussions, the navigator can facilitate the user to clearly realize which target photograph corresponding to the predefined target position has been captured. This results in that those target photographs which are not yet captured can be quickly captured by referring to the navigator, and the process of producing the panoramic image is accelerated.

In another embodiment, two display modes are defined. Regions of the preview screen may be displayed by any of these display modes, according to whether the region is covered by the captured target photographs. When the region is not covered by the captured target photographs, the region is displayed in a first display mode, and vice versa.

The first and the second display modes are set according to different display parameters. According to the present embodiment, the first and the second display modes correspond to a first transparency and a second transparency respectively.

Figure 8A:
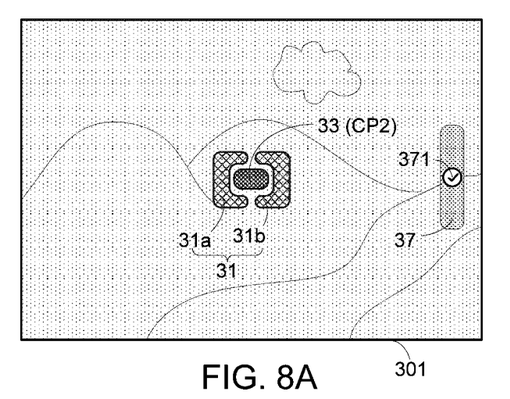
FIG. 8A shows a schematic view illustrating the preview screen is shown by the first display mode.

Referring to FIG. 8A, a preview screen is shown in a first display mode. In FIG. 8A, the target photograph corresponding to the second predefined target position CP2 has not been captured. Under this circumstance, the preview screen on the display screen is displayed with a first transparency.

Figure 8B:
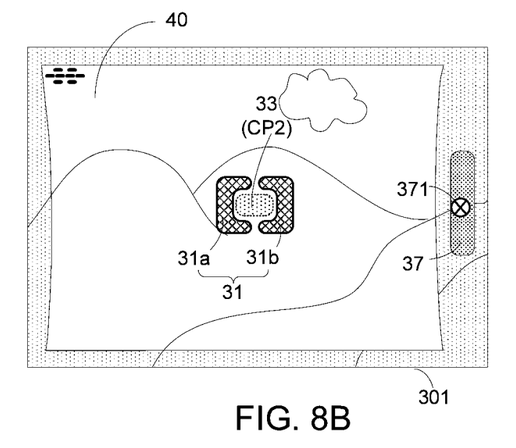
FIG. 8B shows a schematic view illustrating two regions of the preview screen are shown by the first and the second display modes.

FIG. 8B is a schematic view illustrating two regions of the preview screen are shown in the first and the second display modes. In FIG. 8B, the scene at the second predefined target position has been captured. Under this circumstance, a captured region 40 of the preview screen representing the target photograph corresponding to the second predefined target position CP2 is displayed with a second transparency. Moreover, a region outside the captured region 40 of the preview screen is still displayed with the first transparency.

In a case that the predefined target positions are arranged on a spherical surface, the left and right edges of the captured region 40 on the preview screen, the region with the second transparency are curve lines. In addition, if the predefined target position corresponding to the captured target photograph is located at the upper parallel, the top edge of the region with the second transparency is slightly shorter than the bottom edge of the same region. Whereas, if the predefined target position corresponding to the captured target photograph is located at the lower parallel, the top edge of the region with the second transparency is slightly longer than the bottom edge of the same region.

Figure 8C:
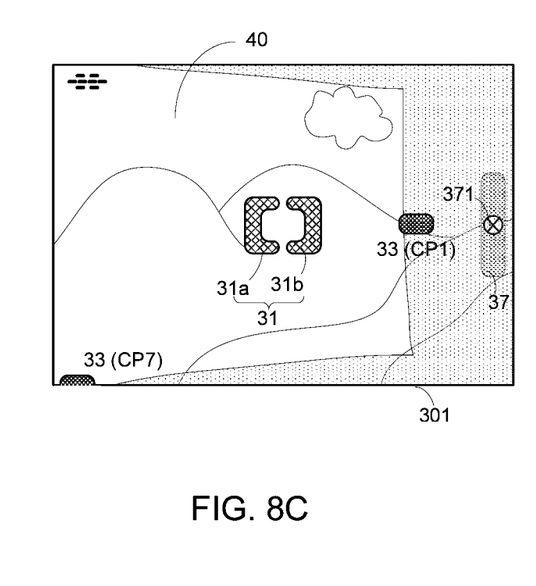
FIG. 8C shows a schematic view illustrating preview screen of the photographing device during a process of searching another predefined target position.

FIG. 8C schematically illustrates preview screen of the photographing device 20 during a process of searching another predefined target position. As shown in FIG. 8C, after the second predefined target position CP2 has been captured, the user may rotate the photographing device 20 to search another target pattern 33 (e.g. the target pattern 33 representing the first predefined target position CP1).

As the posture of the photographing device 20 changes, shape of the region displayed by the second display mode is gradually changed. For instance, comparisons between FIGS. 8B and 8C illustrate how the shape of the region with the second transparency is changed when the photographing device 20 is rotated rightward. In FIG. 8B, length of the left and right edges of the region with the second transparency are substantially equivalent. However, in FIG. 8C, the left edge of the region with the second transparency is longer than the right edge of the region. Furthermore, the upper edge and the lower edge of region with the second transparency shown in FIG. 8C are not straight.

By this photographing method, area size of the region displayed with the first transparency gradually decreases, and area size of the region displayed with the second transparency gradually increases. After all target photographs are captured, the preview screen is always displayed with the second transparency.

Figure 9:
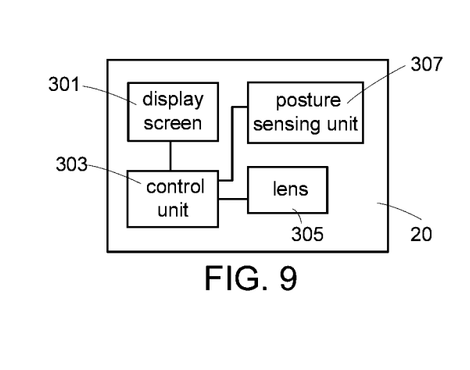
FIG. 9 shows a schematic functional block diagram illustrating the photographing device.

FIG. 9 is a schematic functional block diagram illustrating the photographing device. As shown in FIG. 9, the photographing device 20 includes a display screen 301, a control unit 303, a posture sensing unit 307, and a lens 305. The control unit 303 is electrically connected with the display screen 301, the posture sensing unit 307 and the lens 305. The posture sensing unit 307 may sense the posture of the photographing device 20. An example of the posture sensing unit 307 is a gyroscope.

The operations of the photographing device 20 include two stages; that is, a photographing stage and a displaying stage. During the displaying stage, when the user intends to watch the panoramic image, the user feels like himself/herself stays inside a spherical and watches the panoramic image covered on the spherical. In addition to the prompt patterns provided at the photographing stage, some prompt patterns are provided to facilitate the display of the panoramic image.

Since the display screen 301 has a planar panel, the panoramic image fails to be directly shown on the photographing device 20. On the other hand, the panoramic image is perspectively projected as a virtual image, which is displayed on the display screen 301. The prospective perspective projection of the panoramic image may be based on spherical perspective or a cylindrical perspective projection.

According to the embodiment, the fashion of displaying the panoramic image on the display screen 301 may be adjusted according to the posture of the photographing device 20 and/or user operation (e.g. a resume operation, a scaling operation, or a rotating operation). Consequently, the prompt patterns and the content shown on the display screen 301 will change.

Figure 10:
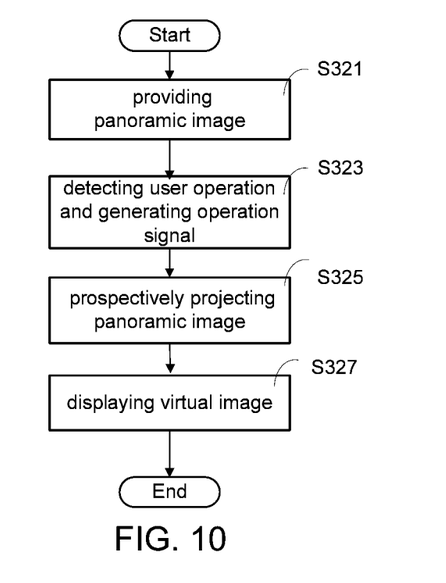
FIG. 10 shows a schematic view illustrating flow chart of displaying the panoramic image.

FIG. 10 is a flow chart of displaying the panoramic image. Firstly, the panoramic image is provided (step S321). Then, the photographing device 20 detects whether user operation(s) exists and consequently generates operation signal(s) (step S323). A target position is calculated/estimated according to the operation signal(s). The target position is corresponding to a position in the spherical/cylinder space representing the panoramic image that the user's sight line towards. Then, the panoramic image is perspectively projected in order to generate the virtual image according to the target position (step S325). The virtual image is then displayed (step S327).

Figure 11:
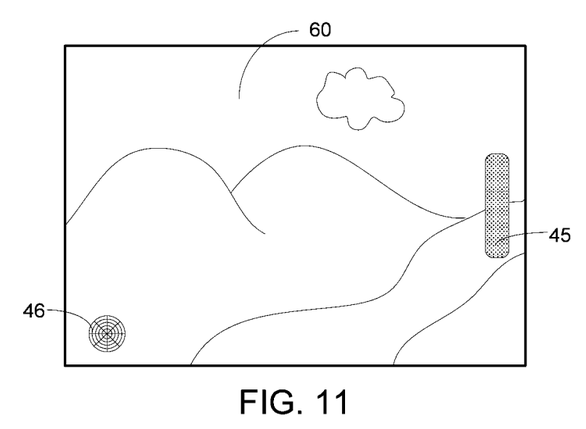
FIG. 11 shows a schematic diagram illustrating a virtual image displayed on the display screen.

FIG. 11 is a schematic diagram illustrating a virtual image displayed on the display screen. As shown in FIG. 11, a resume pattern 45 and an angle viewing indicator 46 are shown on the display screen 301. The angle viewing indicator 46 can be a radar chart 46, which will be illustrated. When the resume pattern 45 is selected by the user, the virtual image will be displayed according to a default position. The default position may be the initial position corresponding to the initial photograph. In addition, the default position may be freely set by the user.

Figure 12:
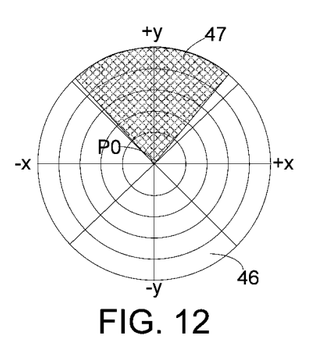
FIG. 12 shows a schematic diagram illustrating an angle viewing indicator as the radar chart with a viewing angle.

FIG. 12 is a schematic diagram illustrating the radar chart with a viewing angle. The gray sector 47 indicates the viewing angle between the default position and the target position corresponding to virtual image. With the angle viewing indicator relating with full-angle-range of the panoramic image, the user learns to know how his/her operation affects forming of the virtual image in a more comprehensive manner. The angle viewing indicator is not limited to the radar chart 46. For instance, a pie chart may be used to represent viewing angle as well.

In this embodiment, the horizontal direction of the radar chart 46 is related to the x-axis of the panoramic image, and the vertical direction of the radar chart 46 is related to the y-axis of the panoramic image. That is, the right and the left sides of the radar chart 46 are respectively related to the positive and the negative directions of the x-axis of the panoramic image. The upward and the downward sides of the radar chart 46 are respectively related to the positive and the negative directions of the y-axis of the panoramic image.

Moreover, the concentric circles of the radar chart 46 indicate distance between the target position and the z-axis. For example, in case that the curve of the gray sector 47 is closer to center of the radar chart 46, the target position is closer to center of the spherical.

Figure 13:
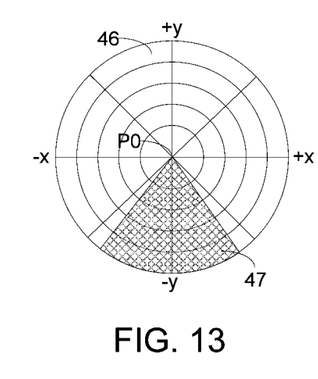
FIG. 13 shows a schematic diagram illustrating the radar chart with another viewing angle.

FIG. 13 is a schematic diagram illustrating radar chart with another viewing angle. The gray sector 47 in FIG. 12 is with an upward arc, and the gray sector 47 in FIG. 13 is with a downward arc. As the gray sector 47 of FIG. 12 and FIG. 13 are opposed to each other, it implies the target positions corresponding to FIG. 12 and FIG. 13 are in opposite direction.

When the user freely proceeds with a preference operation, contents of the virtual image will vary. These preference operations may be a scaling operation, a rotation operation, a recover operation and so forth. Whenever an operation is detected, either by the display screen 301 with touch control function or by the posture sensing unit 307, an operation signal will be automatically generated. With generation of the operation signal, the target position changes.

When a scaling operation is sensed, a scaling operation signal will be consequently generated. The control unit 303 accordingly obtains an image forming distance. The control unit 303 determines and updates the target position according to the image forming distance.

When a rotation operation is generated, a rotation operation signal will be consequently generated. The rotation operations may be caused by rotation of the photographing device 20 itself, or by a touch trajectory on the display screen 301. The control unit 303 accordingly obtains a rotating direction and a rotating angle from the posture sensing unit or from the display screen. Then, the control unit 303 updates the target position according to the rotating direction and the rotating angle.

A resume operation may be detected by the display screen 301. When a resume operation signal is sensed, the control unit 303 changes the target position from a current position to a default position. Thus, a default virtual image will be perspectively projected. The default position may be a target position perpendicular to the x-y plane, or a specific target position set by the user.

Figure 14:
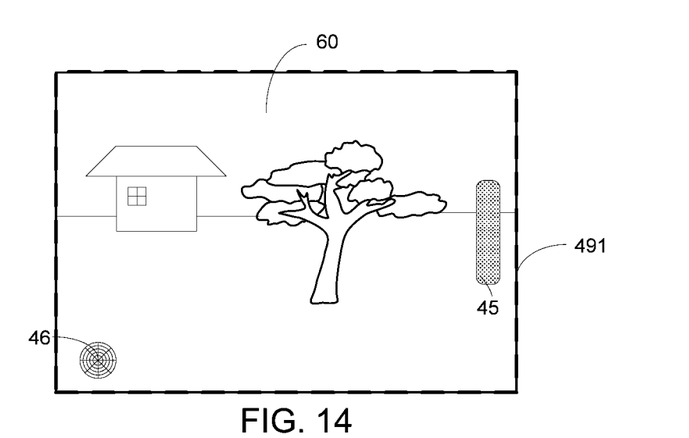
FIG. 14 shows a schematic view illustrating a procedure of capturing the entire virtual image as a selected image.

Afterwards, the control unit 303 controls the display screen 301 to display the virtual image according to the updated target position. Thus, the virtual image displayed by the photographing device 20 may be dynamically changed according to users operation, Moreover, the photographing device 20 has a function of capturing the entire range or a part of the virtual image. FIG. 14 is a schematic view illustrating a procedure of capturing the entire virtual image 60 as a selected image. The virtual image 60 of FIG. 14 contains a house and a tree. By dragging a selecting frame 491 around the virtual image 60, the area being selected by the selecting frame 491 is defined as the selected image.

Figure 15:
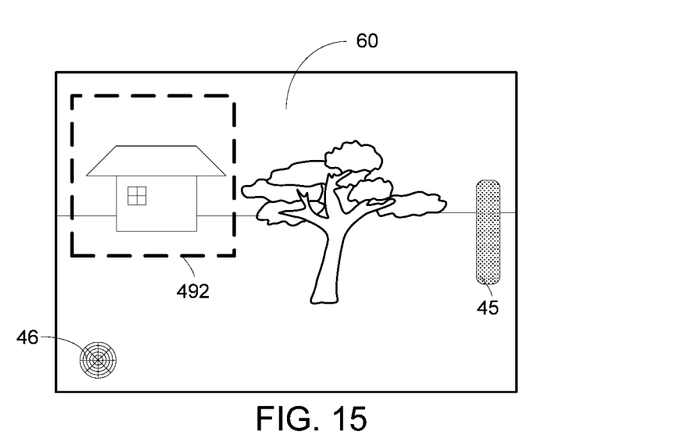
FIG. 15 shows a schematic view illustrating a procedure of capturing part of the virtual image as the selected image.

FIG. 15 is a schematic view illustrating a procedure of capturing part of the virtual image as the selected image. The virtual image 60 is assumed to be identical to that of FIG. 14. The selected image in FIG. 15 is the area circumscribed by the selecting frame 492. As shown in FIG. 15, the user selects the house as the selected image.

Shape of the selecting frame 492 is not limited. For instance, the user may circle a preferred range on the virtual image 60, and the image contained in the preferred range is considered as the selected image. The selected image can be directly displayed or automatically saved.

In accordance with the capturing method as described in FIGS. 14 and 15, the user may select a desired part of the virtual image 60 as the selected image. The size of the selected image is equal to or smaller than the size of the virtual image 60.

Consequently, a desired image may be snapshot according to the user's preference. During the photograph capturing process, even if the user fails to capture a desired photograph along a desired capturing angle because of the environmental limitations, the user can freely select and capture an excellent selected image.

After the initial photograph is captured, prompt patterns such as the target patterns 33, the navigator 35 and indications, the focusing frame 31, the confirmation pattern 37 and so forth. are automatically displayed. By following the prompt patterns, the user can easily capture suitable target photographs.

When the panoramic image is displayed, the angle viewing indicator further assists the user to watch the panoramic image in a more comprehensive manner. Moreover, when displaying the virtual image 60, the photographing device 20 further provides an image capturing function. Thus, the photographing method, the displaying method, and the image capturing method provided by the photographing device 20 are more user-friendly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A panorama photographing method adapted to an electronic device, the panorama photographing method comprising steps of:
   displaying a preview screen;
   calculating, by the electronic device, a plurality of target positions required to produce a panoramic image;
   showing, by the electronic device, a navigator comprising a plurality of indications representing the plurality of target positions;
   generating a plurality of target patterns each indicating one of the target positions and displaying at least one of the target patterns on the preview screen by the electronic device, wherein the position of the at least one of the target patterns displayed on the preview screen is correspondingly changed when the posture of the electronic device changes such that the position of the at least one of the target patterns can be displayed at any position of the preview screen;
   capturing, by the electronic device, a plurality of target photographs corresponding to the plurality of target patterns;
   changing, by the electronic device, appearance of the plurality of indications according to a capturing status of the plurality of target photographs; and
   generating, by the electronic device, the panoramic image according to the plurality of target photographs.

2. The photographing method as claimed in claim 1, wherein the step of changing the appearance of the plurality of indications according to the capturing status of the plurality of target photographs further comprises steps of:
   showing one of the indications in a first state for indicating that the target photograph corresponding to the target position represented by the one indication is not yet, and not ready to be, captured;
   showing another one of the indications in a second state for indicating that the target photograph corresponding to the target position represented by the another one indication is captured; and
   showing other one of the indications in a third state for indicating that the target photograph corresponding to the target position represented by the other one indication is ready to be captured.

3. The photographing method as claimed in claim 2, wherein the first, the second and the third states are set according to a brightness parameter, a transparency parameter, a color tone parameter or a gray level parameter.

4. The photographing method as claimed in claim 1, wherein the step of capturing a plurality of target photographs corresponding to the plurality of target patterns further comprises steps of:
   showing a focusing frame; and
   showing a confirmation pattern if the target pattern corresponding to the one target position is circumscribed by the focusing frame.

5. The photographing method as claimed in claim 4, wherein the step of capturing a plurality of target photographs corresponding to the plurality of target patterns further comprising step of:
   when the target pattern is circumscribed by the focusing frame, changing to display the focusing frame and the target pattern from a standby mode into an active mode.

6. The photographing method as claimed in claim 5, wherein a brightness parameter, a transparency parameter, a color tone parameter or a gray level parameter of the focusing frame and the target pattern is changed in response to the standby mode and the active mode.

7. A panorama photographing method for use in an electronic device, the photographing method comprising steps of:
   displaying a preview screen;
   calculating a plurality of target positions required to produce a panoramic image;
   generating a plurality of target patterns each indicating one of the target positions and displaying at least one of the target patterns on the preview screen by the electronic device, wherein the position of the at least one of the target patterns displayed on the preview screen is correspondingly changed when the posture of the electronic device changes such that the position of the at least one of the target patterns can be displayed at any position of the preview screen;

capturing, by the electronic device, a plurality of target photographs corresponding to the plurality of target patterns;

displaying a region on the preview screen in a first display mode when the region is not covered by any captured target photograph, and displaying the region on the preview screen in a second display mode different from the first display mode when the region is covered by any captured target photograph.

8. The photographing method as claimed in claim 7, wherein the first display mode indicates the target photograph corresponding to the target pattern is not captured; and the second display mode indicates the target photograph corresponding to the target pattern is captured.

9. The photographing method as claimed in claim 7, wherein the step of capturing a plurality of target photographs corresponding to the plurality of target patterns comprises steps of:

showing a focusing frame; and showing a confirmation pattern if the one target pattern corresponding to the one target position is circumscribed by the focusing frame.

10. The photographing method as claimed in claim 9, wherein the step of capturing a plurality of target photographs corresponding to the plurality of target patterns further comprising step of:

when the one target pattern is circumscribed by the focusing frame, changing to display the focusing frame and the one target pattern from a standby mode into an active mode.

11. The photographing method as claimed in claim 10, wherein a brightness parameter, a transparency parameter, a color tone parameter or a gray level parameter of the focusing frame and the one target pattern is changed in response to the standby mode and the active mode.

12. A panorama displaying method adapted to an electronic device, the displaying method comprising steps of:

providing, by the electronic device, a panoramic image and a default position;

sensing an operation signal and correspondingly determining a target position by the electronic device;

perspectively projecting, by the electronic device, the panoramic image for displaying a virtual image extending over a display screen of the electronic device according to the target position, wherein the virtual image is a partial portion of the panoramic image; and showing, by the electronic device, an angle viewing indicator indicating a viewing angle between the default position and the target position.

13. The displaying method as claimed in claim 12, wherein the step of sensing the operation signal and correspondingly determining the target position comprises steps of:

sensing a rotating operation and accordingly obtaining a rotating direction and a rotating angle; and determining the target position according to the rotating direction and the rotating angle.

14. The displaying method as claimed in claim 12, wherein the step of sensing the operation signal and correspondingly determining the target position comprises steps of:

sensing a scaling operation and accordingly obtaining an image forming distance; and determining the target position according to the image forming distance.

15. The displaying method as claimed in claim 12, further comprises steps of:

sensing a resume signal; and perspectively projecting the panoramic image for displaying a default virtual image according to the default position.

16. The displaying method as claimed in claim 12, wherein the step of perspectively projecting the panoramic image for displaying the virtual image is implemented by a spherical perspective projection, or a cylindrical perspective projection.

17. The displaying method as claimed in claim 12, wherein the angle viewing indicator is a radar chart.

18. The displaying method as claimed in claim 17, wherein the radar chart is related with full-angle-range of the panoramic image, and the radar chart has a sector corresponding to the viewing angle between the default position and the target position.

19. An image capturing method adapted to an electronic device, the image capturing method comprising steps of:

providing, by the electronic device, a panoramic image;

sensing an operation signal and correspondingly determining a target position by the electronic device;

perspectively projecting, by the electronic device, the panoramic image for displaying a virtual image extending over a display screen of the electronic device according to the target position, wherein the virtual image is a partial portion of the panoramic image; and capturing, by the electronic device, a selected image from the virtual image displayed on the display screen.

20. The image capturing method as claimed in claim 19, wherein a size of the selected image is equal to or smaller than a size of the displayed virtual image.

* * * * *